US009424240B2

(12) United States Patent
Beezer et al.

(10) Patent No.: US 9,424,240 B2
(45) Date of Patent: *Aug. 23, 2016

(54) ANNOTATIONS FOR ELECTRONIC CONTENT

(71) Applicant: Microsoft Technology Licensing, LLC, Redmond, WA (US)

(72) Inventors: John L. Beezer, Redmond, WA (US); David M. Silver, Redmond, WA (US); Marco M. DeMello, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/047,872

(22) Filed: Oct. 7, 2013

(65) Prior Publication Data

US 2015/0100872 A1    Apr. 9, 2015

Related U.S. Application Data

(63) Continuation of application No. 12/499,721, filed on Jul. 8, 2009, now Pat. No. 8,555,198, which is a continuation of application No. 11/224,936, filed on Sep. 14, 2005, now Pat. No. 7,568,168, which is a continuation of application No. 09/455,807, filed on Dec. 7, 1999, now Pat. No. 7,028,267.

(51) Int. Cl.
*G06F 17/24* (2006.01)
*G06F 17/21* (2006.01)

(52) U.S. Cl.
CPC .................. *G06F 17/241* (2013.01)

(58) Field of Classification Search
CPC ........................ G06F 17/241; G06F 17/2247

USPC .......................................................... 715/230
See application file for complete search history.

(56) References Cited

U.S. PATENT DOCUMENTS 5,146,552 A    9/1992  Cassorla et al.
5,237,648 A    8/1993  Mills et al.
(Continued)

FOREIGN PATENT DOCUMENTS

EP    0342838    11/1989
EP    645726     3/1995
(Continued)

OTHER PUBLICATIONS

Cunningham,"Software Infrastructure for Natural Language Processing", In Proceedings of the fifth conference on Applied natural language processing, Mar. 31, 1997, pp. 237-244.
(Continued)

*Primary Examiner* — Scott Baderman
*Assistant Examiner* — Hassan Mrabi
(74) *Attorney, Agent, or Firm* — John Jardine; Judy Yee; Micky Minhas

(57) ABSTRACT

Embodiments are described for capturing, displaying, and navigating annotations in an electronic document. In some embodiments, a selection of an object in the electronic document is received, and an annotation associated with the selected object is received. The annotation is maintained in a list of annotations. The annotation can also be displayed. In some embodiments, a selection of the annotation is received and in response to the selection of the annotation being received, a user may be navigated to a location of the selected object in the electronic document.

20 Claims, 10 Drawing Sheets

(56) References Cited

U.S. PATENT DOCUMENTS

| | | | |
|---|---|---|---|
| 5,239,466 A | 8/1993 | Morgan et al. | |
| 5,253,362 A | 10/1993 | Nolan et al. | |
| RE34,476 E | 12/1993 | Norwood | |
| 5,347,295 A | 9/1994 | Agulnick et al. | |
| 5,390,138 A | 2/1995 | Milne et al. | |
| 5,434,929 A | 7/1995 | Beernink et al. | |
| 5,434,965 A | 7/1995 | Matheny et al. | |
| 5,471,568 A | 11/1995 | Webb et al. | |
| 5,473,742 A | 12/1995 | Polyakov et al. | |
| 5,557,722 A * | 9/1996 | DeRose | G06F 17/211 707/E17.123 |
| 5,559,942 A | 9/1996 | Gough et al. | |
| 5,572,643 A | 11/1996 | Judson | |
| 5,581,682 A | 12/1996 | Anderson et al. | |
| 5,596,700 A | 1/1997 | Darnell et al. | |
| 5,600,775 A * | 2/1997 | King | G06F 17/30817 348/E7.083 |
| 5,623,679 A | 4/1997 | Rivette et al. | |
| 5,625,833 A | 4/1997 | Levine et al. | |
| 5,630,125 A | 5/1997 | Zellweger | |
| 5,632,022 A | 5/1997 | Warren et al. | |
| 5,644,674 A | 7/1997 | Aihara et al. | |
| 5,666,113 A | 9/1997 | Logan | |
| 5,680,636 A | 10/1997 | Levine et al. | |
| 5,682,439 A | 10/1997 | Beernink et al. | |
| 5,687,331 A | 11/1997 | Volk et al. | |
| 5,689,717 A | 11/1997 | Pritt | |
| 5,717,860 A | 2/1998 | Graber et al. | |
| 5,717,879 A | 2/1998 | Moran | |
| 5,719,595 A | 2/1998 | Hoddie et al. | |
| 5,727,129 A | 3/1998 | Barrett et al. | |
| 5,729,687 A | 3/1998 | Rothrock et al. | |
| 5,737,599 A | 4/1998 | Rowe et al. | |
| 5,745,116 A | 4/1998 | Pisutha-Arnond | |
| 5,760,773 A | 6/1998 | Berman et al. | |
| 5,761,485 A | 6/1998 | Munyan | |
| 5,761,683 A | 6/1998 | Logan et al. | |
| 5,784,058 A | 7/1998 | LaStrange et al. | |
| 5,786,814 A | 7/1998 | Moran et al. | |
| 5,790,818 A | 8/1998 | Martin | |
| 5,799,268 A | 8/1998 | Boguraev | |
| 5,799,318 A | 8/1998 | Cardinal et al. | |
| 5,801,687 A | 9/1998 | Peterson et al. | |
| 5,802,516 A | 9/1998 | Shwarts et al. | |
| 5,819,301 A | 10/1998 | Rowe et al. | |
| 5,821,925 A | 10/1998 | Carey et al. | |
| 5,822,720 A | 10/1998 | Bookman et al. | |
| 5,826,025 A | 10/1998 | Gramlich | |
| 5,832,263 A | 11/1998 | Hansen et al. | |
| 5,835,092 A | 11/1998 | Boudreau et al. | |
| 5,838,313 A | 11/1998 | Hou et al. | |
| 5,838,914 A | 11/1998 | Carleton et al. | |
| 5,845,262 A | 12/1998 | Nozue et al. | |
| 5,854,630 A | 12/1998 | Nielsen | |
| 5,860,074 A | 1/1999 | Rowe et al. | |
| 5,862,395 A | 1/1999 | Bier | |
| 5,877,757 A | 3/1999 | Baldwin et al. | |
| 5,893,126 A * | 4/1999 | Drews | G06F 3/0481 715/203 |
| 5,893,132 A | 4/1999 | Huffman et al. | |
| 5,918,236 A | 6/1999 | Wical | |
| 5,920,317 A | 7/1999 | McDonald | |
| 5,920,694 A | 7/1999 | Carleton et al. | |
| 5,923,326 A | 7/1999 | Bittinger et al. | |
| 5,924,104 A | 7/1999 | Earl | |
| 5,931,912 A | 8/1999 | Wu et al. | |
| 5,933,139 A | 8/1999 | Feigner et al. | |
| 5,933,140 A | 8/1999 | Strahorn et al. | |
| 5,937,416 A | 8/1999 | Menzel | |
| 5,940,080 A | 8/1999 | Ruehle et al. | |
| 5,948,040 A | 9/1999 | DeLorme et al. | |
| 5,950,214 A | 9/1999 | Rivette et al. | |
| 5,956,034 A | 9/1999 | Sachs et al. | |
| 5,956,048 A | 9/1999 | Gaston | |
| 5,978,818 A | 11/1999 | Lin | |
| 5,982,370 A | 11/1999 | Kamper | |
| 5,983,248 A | 11/1999 | DeRose et al. | |
| 5,986,665 A | 11/1999 | Sumner et al. | |
| 5,999,908 A | 12/1999 | Abelow | |
| 6,011,537 A | 1/2000 | Slotznick | |
| 6,012,055 A | 1/2000 | Campbell et al. | |
| 6,018,334 A | 1/2000 | Eckerberg et al. | |
| 6,018,342 A | 1/2000 | Bristor | |
| 6,018,344 A | 1/2000 | Harada et al. | |
| 6,018,742 A | 1/2000 | Herbert, III | |
| 6,025,841 A | 2/2000 | Finkelstein et al. | |
| 6,034,689 A | 3/2000 | White et al. | |
| 6,035,330 A | 3/2000 | Astiz et al. | |
| 6,037,934 A | 3/2000 | Himmel et al. | |
| 6,038,598 A | 3/2000 | Danneels | |
| 6,049,812 A | 4/2000 | Bertram et al. | |
| 6,052,514 A | 4/2000 | Gill et al. | |
| 6,054,990 A | 4/2000 | Tran | |
| 6,055,538 A | 4/2000 | Kessenich et al. | |
| 6,064,384 A | 5/2000 | Ho | |
| 6,072,490 A | 6/2000 | Bates et al. | |
| 6,076,917 A | 6/2000 | Wen | |
| 6,081,829 A | 6/2000 | Sidana | |
| 6,088,481 A | 7/2000 | Okamoto et al. | |
| 6,091,930 A | 7/2000 | Mortimer et al. | |
| 6,094,197 A | 7/2000 | Buxton et al. | |
| 6,105,044 A | 8/2000 | DeRose et al. | |
| 6,118,437 A | 9/2000 | Fleck et al. | |
| 6,122,649 A | 9/2000 | Kanerva et al. | |
| 6,128,007 A | 10/2000 | Seybold | |
| 6,133,925 A | 10/2000 | Jaremko et al. | |
| 6,141,007 A | 10/2000 | Lebling et al. | |
| 6,144,375 A | 11/2000 | Jain et al. | |
| 6,144,991 A | 11/2000 | England | |
| 6,151,622 A | 11/2000 | Fraenkel et al. | |
| 6,154,771 A | 11/2000 | Rangan et al. | |
| 6,157,381 A | 12/2000 | Bates et al. | |
| 6,163,778 A | 12/2000 | Fogg et al. | |
| 6,181,344 B1 | 1/2001 | Tarpenning et al. | |
| 6,184,886 B1 | 2/2001 | Bates et al. | |
| 6,195,679 B1 | 2/2001 | Bauersfeld et al. | |
| 6,195,694 B1 | 2/2001 | Chen et al. | |
| 6,199,082 B1 | 3/2001 | Ferrel et al. | |
| 6,205,419 B1 | 3/2001 | Fiedler | |
| 6,205,455 B1 | 3/2001 | Umen et al. | |
| 6,211,871 B1 | 4/2001 | Himmel et al. | |
| 6,226,655 B1 | 5/2001 | Borman et al. | |
| 6,230,171 B1 | 5/2001 | Pacifici et al. | |
| 6,239,792 B1 | 5/2001 | Yanagisawa et al. | |
| 6,243,071 B1 | 6/2001 | Shwarts et al. | |
| 6,243,091 B1 | 6/2001 | Berstis | |
| 6,262,719 B1 | 7/2001 | Bi et al. | |
| 6,266,772 B1 | 7/2001 | Suzuki | |
| 6,271,840 B1 | 8/2001 | Finseth et al. | |
| 6,272,484 B1 | 8/2001 | Martin et al. | |
| 6,279,005 B1 | 8/2001 | Zellweger | |
| 6,279,014 B1 | 8/2001 | Schilit et al. | |
| 6,286,002 B1 | 9/2001 | Axaopoulos et al. | |
| 6,289,126 B1 | 9/2001 | Ishisaka | |
| 6,289,362 B1 | 9/2001 | Van Der Meer | |
| 6,301,590 B1 | 10/2001 | Siow et al. | |
| 6,320,169 B1 | 11/2001 | Clothier | |
| 6,320,577 B1 | 11/2001 | Alexander | |
| 6,321,244 B1 | 11/2001 | Liu et al. | |
| 6,331,866 B1 | 12/2001 | Eisenberg | |
| 6,331,867 B1 | 12/2001 | Eberhard et al. | |
| 6,335,727 B1 | 1/2002 | Morishita et al. | |
| 6,340,967 B1 | 1/2002 | Maxted | |
| 6,340,980 B1 | 1/2002 | Ho | |
| 6,343,275 B1 | 1/2002 | Wong | |
| 6,356,287 B1 | 3/2002 | Ruberry et al. | |
| 6,369,811 B1 | 4/2002 | Graham et al. | |
| 6,370,497 B1 | 4/2002 | Knowles | |
| 6,377,983 B1 | 4/2002 | Cohen et al. | |
| 6,389,434 B1 * | 5/2002 | Rivette | G06F 17/30014 707/E17.008 |
| 6,393,422 B1 | 5/2002 | Wone et al. | |
| 6,397,213 B1 * | 5/2002 | Cullen | G06F 17/30017 |
| 6,397,264 B1 | 5/2002 | Stasnick et al. | |

(56) References Cited

U.S. PATENT DOCUMENTS

| | | |
|---|---|---|
| 6,405,221 B1 | 6/2002 | Levine et al. |
| 6,418,421 B1 | 7/2002 | Hurtado et al. |
| 6,421,065 B1 | 7/2002 | Walden et al. |
| 6,425,525 B1 | 7/2002 | Swaminathan et al. |
| 6,437,793 B1 | 8/2002 | Kaasila |
| 6,437,807 B1 | 8/2002 | Berquist et al. |
| 6,446,110 B1 | 9/2002 | Lection et al. |
| 6,456,303 B1 | 9/2002 | Walden et al. |
| 6,457,013 B1 | 9/2002 | Saxton et al. |
| 6,460,058 B2 | 10/2002 | Koppolu et al. |
| 6,484,156 B1 | 11/2002 | Gupta et al. |
| 6,486,895 B1 | 11/2002 | Robertson et al. |
| 6,489,968 B1 | 12/2002 | Ortega et al. |
| 6,490,603 B1 | 12/2002 | Keenan et al. |
| 6,493,702 B1 | 12/2002 | Adar et al. |
| 6,529,920 B1 | 3/2003 | Arons et al. |
| 6,535,294 B1 | 3/2003 | Arledge, Jr. et al. |
| 6,539,370 B1 | 3/2003 | Chang et al. |
| 6,549,220 B1 | 4/2003 | Hsu et al. |
| 6,549,878 B1 | 4/2003 | Lowry et al. |
| 6,560,621 B2 | 5/2003 | Barile |
| 6,571,211 B1 | 5/2003 | Dwyer et al. |
| 6,571,295 B1 | 5/2003 | Sidana |
| 6,573,907 B1 | 6/2003 | Madrane |
| 6,585,776 B1 | 7/2003 | Bates et al. |
| 6,597,377 B1 | 7/2003 | MacPhail |
| 6,631,496 B1 | 10/2003 | Li et al. |
| 6,636,238 B1 | 10/2003 | Amir et al. |
| 6,647,534 B1 | 11/2003 | Graham |
| 6,651,218 B1 | 11/2003 | Adler et al. |
| 6,662,310 B2 | 12/2003 | Lopez et al. |
| 6,675,356 B1 | 1/2004 | Adler et al. |
| 6,687,878 B1* | 2/2004 | Eintracht ............... G06F 17/241 707/E17.117 |
| 6,697,997 B1 | 2/2004 | Fujimura |
| 6,710,790 B1 | 3/2004 | Fagioli |
| 6,714,214 B1 | 3/2004 | DeMello et al. |
| 6,760,884 B1 | 7/2004 | Vertelney et al. |
| 6,769,013 B2 | 7/2004 | Frees et al. |
| 6,772,139 B1 | 8/2004 | Smith, III |
| 6,788,316 B1 | 9/2004 | Ma et al. |
| 6,801,685 B2 | 10/2004 | Goodman et al. |
| 6,865,713 B1* | 3/2005 | Bates ................. G06F 17/30905 707/E17.121 |
| 6,871,318 B1 | 3/2005 | Wynblatt et al. |
| 6,904,450 B1 | 6/2005 | King et al. |
| 6,956,593 B1 | 10/2005 | Gupta et al. |
| 6,957,233 B1 | 10/2005 | Beezer et al. |
| 7,028,267 B1* | 4/2006 | Beezer ................... G06F 17/241 715/802 |
| 7,194,679 B1 | 3/2007 | Green |
| 7,203,910 B1 | 4/2007 | Hugh et al. |
| 7,568,168 B2 | 7/2009 | Beezer et al. |
| 8,078,958 B2* | 12/2011 | Cottrille ................ G06F 17/241 715/230 |
| 8,555,198 B2 | 10/2013 | Beezer et al. |
| 2001/0031128 A1 | 10/2001 | Manbeck |
| 2001/0051958 A1* | 12/2001 | deVries ............. G06F 17/30817 715/233 |
| 2002/0007373 A1* | 1/2002 | Blair ................. G06F 17/30011 715/223 |
| 2002/0016786 A1 | 2/2002 | Pitkow et al. |
| 2002/0097261 A1 | 7/2002 | Gottfurcht et al. |
| 2002/0099552 A1 | 7/2002 | Rubin et al. |
| 2002/0194260 A1 | 12/2002 | Headley et al. |
| 2005/0060138 A1 | 3/2005 | Wang et al. |
| 2005/0081159 A1* | 4/2005 | Gupta ..................... G06F 17/22 715/751 |
| 2006/0288842 A1* | 12/2006 | Sitrick ................. G09B 15/002 84/477 R |
| 2007/0078886 A1* | 4/2007 | Rivette ............. G06F 17/30011 |
| 2007/0255810 A1 | 11/2007 | Shuster |
| 2009/0271381 A1 | 10/2009 | Beezer et al. |
| 2014/0380211 A1* | 12/2014 | Barros ............. G06F 17/30241 715/764 |
| 2015/0143235 A1* | 5/2015 | Krause .................. G06F 3/0219 715/270 |

FOREIGN PATENT DOCUMENTS

| | | |
|---|---|---|
| EP | 0822501 | 2/1998 |
| EP | 0890926 | 1/1999 |
| EP | 0902379 | 3/1999 |
| JP | 11327789 | 11/1999 |
| JP | 2009080825 | 4/2009 |
| WO | WO-8701481 | 3/1987 |
| WO | WO-9620908 | 7/1996 |
| WO | WO-9722109 | 6/1997 |
| WO | WO-9806054 | 2/1998 |
| WO | WO-9809446 | 3/1998 |
| WO | WO-9949383 | 9/1999 |
| WO | WO-0219919 | 1/2002 |

OTHER PUBLICATIONS

Hori, et al., "Annotation of Web Content for Transcoding", World Wide Web Consortium (W3C), Jul. 10, 1999, 13 pages.
"Advisory Action", U.S. Appl. No. 09/455,807, (Jun. 27, 2003), 2 pages.
"aha! 2.0 for Windows InkWriter the Power of word processing, the convenience of pen and paper", (1995), 2 pages.
"aha! Inkwriter for Magic Cap the fastest, most convenient way to create faxes, notes and messages", (1995), 2 pages.
"aha! Inkwriter the simplicity of pen and paper, the power of word processing", (1995), 2 pages.
"aha! software products, Web Page List of Products", Retrieved from: <http://www.ahasoft.com//product.htm>on Sep. 24, 1997 Aha Software Corporation, Mountain View, CA, (1995), 5 pages.
"Bizweb2000.com—screenshots of an e-book", (May 1999), 3 Pages.
"Dublin Core Metadata Element Set, Version 1.1 Reference Description", Retrieved from: <http://purl.org/dc>, (Sep. 20, 1999), 5 pages.
"Dublin Core Metadata Initiative: User Guide Working Draft", Retrieved from: <http://purl.org/dc>, (Sep. 20, 1999), pp. 1-16.
"Dublin Core Resource Types: Structuralist Draft", Retrieved from: <http://sunsite.berkeley.edu/Metadata/structuralist.html>, (Jul. 24, 1997), pp. 1-3.
"Explore the Features of the Rocket eBook", Retrieved from. wysiwyg://212http://www.rocketebook.com/Products/Tour/index. html, (1998),1 page.
"Final Office Action", U.S. Appl. No. 09/455,807, (Apr. 9, 2003), 8 pages.
"Final Office Action", U.S. Appl. No. 09/455,807, (Jun. 15, 2004), 8 pages.
"Final Office Action", U.S. Appl. No. 12/499,721, (Aug. 1, 2012),10 pages.
"Hucklefine Defined", Retrieved from: <http://www.ylem.org/artists/mmosher/huck.html>, (Apr. 1990), 3 Pages.
"Joke eBook", PrimaSoft Pc, Inc., Electronic Book Series Version 1.0, (Jul. 1998), pp. 1-5.
"Non-Final Office Action", U.S. Appl. No. 09/455,807, (Jul. 19, 2002), 8 pages.
"Non-Final Office Action", U.S. Appl. No. 09/455,807, (Nov. 29, 2004), 8 pages.
"Non-Final Office Action", U.S. Appl. No. 09/455,807, (Dec. 30, 2003), 7 pages.
"Non-Final Office Action", U.S. Appl. No. 11/224,936, (Oct. 17, 2008), 4 pages.
"Non-Final Office Action", U.S. Appl. No. 12/499,721, (Apr. 17, 2012), 9 pages.
"Notice of Allowance", U.S. Appl. No. 09/455,807, (May 31, 2005), 4 pages.
"Notice of Allowance", U.S. Appl. No. 09/455,807, (Sep. 19, 2005), 6 pages.
"Notice of Allowance", U.S. Appl. No. 11/224,936, (May 21, 2009), 7 pages.

(56) References Cited

OTHER PUBLICATIONS

"Notice of Allowance", U.S. Appl. No. 12/499,721, (Jun. 4, 2013),11 pages.
"Open eBook Forum, Open eBook Publication Structure 1.0", Retrieved from: <http://www.ebxwg.org/oebps/oebps1.0/download/oeb1-oebps.htm>, (Sep. 16, 1999), pp. 1-66.
"PhotoImpact 3.0, Ulead Systems Inc.,", (Jan. 1996), 7 pages.
"Rocket eBook Using the Rocket eBook", http://www.rocketbook.com/Products/Faq/usinq.html, (1999), 2 pages.
"Softbook Press, The Leader in Internet-Enabled Document Distribution and Reading Systems", http://www.softbook.com/consumer/reader.asp, (1999), 3 pages.
"Tour of Korea Hypercard Stack", Retrieved from: <http://www.groseducationalmedia.ca/kor2.html>, Grose Educational Media,(1994), 2 Pages.
"Word 2000 (9.0 6926 SP-3)", Microsoft Corporation, (1999),5 pages.
Adobe, "Adobe Acrobat 3.0 Reader Online Guide", Adobe Systems, Inc, (1996), 110 pages.
Crespo, Arturo et al., "Responsive Interaction for a Large Web Application: the Meteor Shower Architecture in the WebWriter II Editor", *Computer Networks and ISDN Systems*, (1997), pp. 1507-1517.
Crespo, et al., "Computer Networks and ISDN Systems: Responsive interaction for a large Web application the Meteor Shower architecture in the WebWriter II Editor", Comnet Online http://www.elsevier.nl/locate/comnet, (1997), pp. 1507-1517.
Graefe, Christopher et al., "Designing the Muse: A Digital Music Stand for the Symphony Musician", *CHI 96*, Available at <portal.acm.org/ft_gateway.cfm?id=238599&type=pdf>,(Apr. 12-18, 1996), pp. 436-440.
Greenberg, Saul "A Fisheye Text Editor for Relaxed-WYSIWIS Groupware", Department of Computer Science, Univeristy of Calgary *Electronic Proceedings, Short Papers* Chapter 96, (1996), pp. 1-5.
Hirotsu, T. et al., "Cmew/U—A Multimedia Web Annotation Sharing System, NTT Innovation Labs", *TENCON 99. Proceedings of the IEEE Region 10 Conference*, (Sep. 1999), pp. 356-359.
Kristensen, Anders "Formsheets and the XML Forms Language", HP Labs (Bristol). Filton Rd, Bristol, BS34 8QZ UK, (Mar. 1999), pp. 1-15.
Kunikazu, T. "Patent Abstracts of Japananese Publication No. 113287789 for Color Display and Electronic Blackboard System", (Nov. 30, 1999), pp. 1-34.
Kuo, Chin-Hwa et al., "A Synchronization Scheme for Multimedia Annotation", Multimedia Information NEtworking Laboratory, Tamkang University, IEEE, Taiwan,(1997), pp. 594-598.
Landay, J. A., et al., "Making Sharing Pervasive: Ubiquitous Computing for Shared Note Taking", *IBM Systems Journal*, vol. 38, No. 4, (1999), pp. 531-550.
Landay, James A., "Using Note-Taking Appliances for Student to Student Collaboration", *29th Annual Frontiers in Education Conference, IEEE Computer Society*, Nov. 1999, Session 12C4/15-12C4/20, (Nov. 1999), 9 Pages.
Marshall, Catherine C., "Annotations from Paper Books to the Digital Library", *ACM Conference on Digital Libraries*, (1997), pp. 131-140.
McDonald, John "Adobe Acrobat 3.0 Review", Retrieved from: <http://www.hmug.org/Reviews/> on Dec. 19, 2005., (1997),18 Pages.
Muyan, Daniel "Everybook, Inc: Developing the E-Book in Relation to Publishing Standards", *Business*, Availabe at <http://www.futureprint.kent.edu/articles/munyan0.1htm>,(Sep. 30, 1998), pp. 1-7.
NuvoMedia, Inc., "Using the Rocket eBook", Retrieved from: <http://www.rocketbook.com/Products/Faq/using.html> on Oct. 14, 1999, (1999), pp. 1-2.
Schilit, Bill N., et al., "Digital Library Information Appliances", *International Conference on Digital Libraries*, '98, Available at <portal.acm.org/citation.cfm?id=276675.276700>,(1998), pp. 217-226.

\* cited by examiner

ANNOTATIONS FOR ELECTRONIC CONTENT

RELATED APPLICATIONS

This application is a continuation of and claims priority to U.S. patent application Ser. No. 12/499,721, filed on Jul. 8, 2009 which claims priority to U.S. patent application Ser. No. 11/224,936, filed on Sep. 14, 2005, now issued as U.S. Pat. No. 7,568,168 which in turn is a continuation of U.S. patent application Ser. No. 09/455,807, filed on Dec. 7, 1999, now issued as U.S. Pat. No. 7,028,267, the disclosures of which are incorporated in their entirety by reference herein.

BACKGROUND

This disclosure generally relates to the electronic display of documents. More particularly, the disclosure relates to the placement and use of text annotations in electronically displayed documents.

Many factors today drive the development of computers and computer software. One of these factors is the desire to provide accessibility to information virtually anytime and anywhere. The proliferation of notebook computers, personal digital assistants (PDAs), and other personal electronic devices reflect the fact that users want to be able to access information wherever they may be, whenever they want. In order to facilitate greater levels of information accessibility, the presentation of information must be made as familiar and comfortable as possible.

In this vein, one way to foster success of electronic presentations of information will be to allow users to handle information in a familiar manner. Stated another way, the use and manipulation of electronically-presented information may mimic those paradigms that users are most familiar with, e.g., printed documents, as an initial invitation to their use. As a result, greater familiarity between users and their "machines" will be engendered, thereby fostering greater accessibility, even if the machines have greater capabilities and provide more content to the user beyond the user's expectations. Once users feel comfortable with new electronic presentations, they will be more likely to take advantage of an entire spectrum of available functionality.

One manner of encouraging familiarity is to present information in an electronic book format in which a computer displays information in a manner that closely resembles printed books. In order to more completely mimic a printed book, users will need to have the ability to make textual notes to themselves, akin to writing in the margins of paper books. Users will also want to highlight selected portions, as these are active-reading activities of which a user would expect to see in an electronic book. Users will want to add drawings, arrows, underlining, strikethroughs, and the like, also akin to writing in paper books. Finally, users will want to add bookmarks.

The above-identified so-called "active-reading" activities can be available in electronic document editors. However, all of these active-reading activities require modification of the underlying document through inserting the new text into the original document. This insertion corrupts the underlying document from its pre-insertion, pristine state. While this may not be an issue in an editable document, the modification of a copyrighted document may run afoul of various copyright provisions. The violations may be compounded with the forwarding of the document to another in its modified state. Further, irrespective of any copyright transgressions, publishing houses responsible for the distribution of the underlying text may not be pleased with any ability to modify their distributed and copyrighted works.

Thus, the users' desire to actively read and annotate works clashes with the goals of publishing houses to keep copyrighted works in their unmodified state. Without solution of this dilemma, the growth of the electronic publishing industry may be hampered, on one hand, by readers who refuse to purchase electronic books because of the inability to annotate read-only documents and, on the other hand, by the publishing industry that refuses to publish titles that allow for annotations that destroy the pristine compilation of the electronic works.

Further, while it has been possible to make textual notes in electronic documents, previous interfaces have been cumbersome to use. These interfaces often require a user to navigate through a number of options to open an interface to add textual notes. For example, to add text notes, one needs navigate to a menu bar zone, instantiate the menu bar by clicking on a menu icon, select the action the user wants to take (add text notes, for example), then navigate to the location where the text notes are to be inserted. This number of steps can become increasingly tedious the more the user tends to annotate displayed content. This increase in tedium may force the user away from reading and annotating content in electronic form.

SUMMARY

Embodiments are discussed for annotating an electronic document or electronic book without corruption of the document itself. According to some embodiments, a "document" can encompass all forms of electronically displayable information including, but not limited to, books, manuals, reference materials, picture books, and so on. In some embodiments, to create an annotation, a user can select an object in the document to locate where the annotation is to be placed. A computer system can determine which object has been selected and can determine a file position associated with the selected object. The user can add an annotation and return to reading the document. Annotations may include, but are not limited to, highlighting, making textual notes, drawings, doodles, arrows, underlining, strike-throughs, and the like. In some embodiments, the annotations may be filtered, navigated, sorted, and indexed per user input.

Some embodiments include an enhanced user interface that provides the ability to quickly add text annotations without having to navigate a complex interface. The user interface can provide for navigation between related annotations. In some embodiments, navigation functionality may be combined with the adding text functionality on the same displayed interface.

According to some embodiments, a displayed "object" may include text, graphics, equations, and/or other related elements as contained in a displayed document. For the purpose of this disclosure, annotations can be generally related to textual annotations. However, other annotations that may be used include highlighting, drawings (as one can do with a pencil or pen to a paper book), bookmarks, and so on. While the annotations can be displayed in conjunction with the document, the underlying document may remain unmodified. Related annotations are described in the following disclosures:

U.S. Ser. No. 09/456,127, filed Dec. 7, 1999 and now issued as U.S. Pat. No. 6,992,687, entitled "Bookmarking and Placemarking a Displayed Document in a Computer System;"

U.S. Ser. No. 09/455,754, filed Dec. 7, 1999, entitled "Method and Apparatus for Installing and Using Reference Materials In Conjunction With Reading Electronic Content;"

U.S. Ser. No. 09/455,805, filed Dec. 7, 1999 and now issued at U.S. Pat. No. 7,337,389, entitled "System and Method for Annotating an Electronic Document Independently of Its Content;" and U.S. Ser. No. 09/455,806, filed Dec. 7, 1999 and now issued at U.S. Pat. No. 6,957,233, entitled "Method and Apparatus For Capturing and Rendering Annotations For Non-Modifiable Electronic Content."

In accordance with some embodiments, to associate an annotation with a selected object, the annotations can be linked to a file position in a non-modifiable document. Some embodiments can calculate a file position of, for example, the first character of the word (or other displayed element) and store the file position with the annotation in a separate, linked local file. Alternatively, the non-modifiable document may represent a non-modifiable portion of a file, with the annotations being added to a write-enabled portion of the file.

In some embodiments, the determined file position may be used for direct random access into the non-modifiable document with the document being compressed or decompressed. In some embodiments, the file position can be specified in a UTF-8 (a known textual storage format) document derived from an original Unicode (another known textual storage format) document. However, in order to conserve space, the non-modifiable document may be compressed using a general purpose binary compression algorithm, decompressed, and translated to Unicode for viewing. Accordingly, the file position as stored for an annotation can be consistent through various storage schemes and compression techniques.

These and other advantages, details, embodiments, features, and objects will be apparent to those skilled in the art from the following detailed description and the claims and drawings, listed herein.

DETAILED DESCRIPTION

Embodiments are discussed for capturing annotations associated with electronic content, such as an electronic document. Example implementations are discussed in the general context of computer-executable instructions, such as program modules. Generally, program modules can include routines, programs, objects, scripts, components, data structures, and so on, that can perform particular tasks or implement particular abstract data types. Moreover, those skilled in the art will appreciate that one or more embodiments may be practiced with any number of computer system configurations including, but not limited to, distributed computing environments where tasks can be performed by remote processing devices that are linked through a communications network. In a distributed computing environment, program modules may be located in both local and remote memory storage devices. Some embodiments may also be practiced utilizing personal computers (PCs), hand-held devices, multiprocessor systems, microprocessor-based or programmable consumer electronics, network PCs, minicomputers, mainframe computers, and the like.

Figure 1:
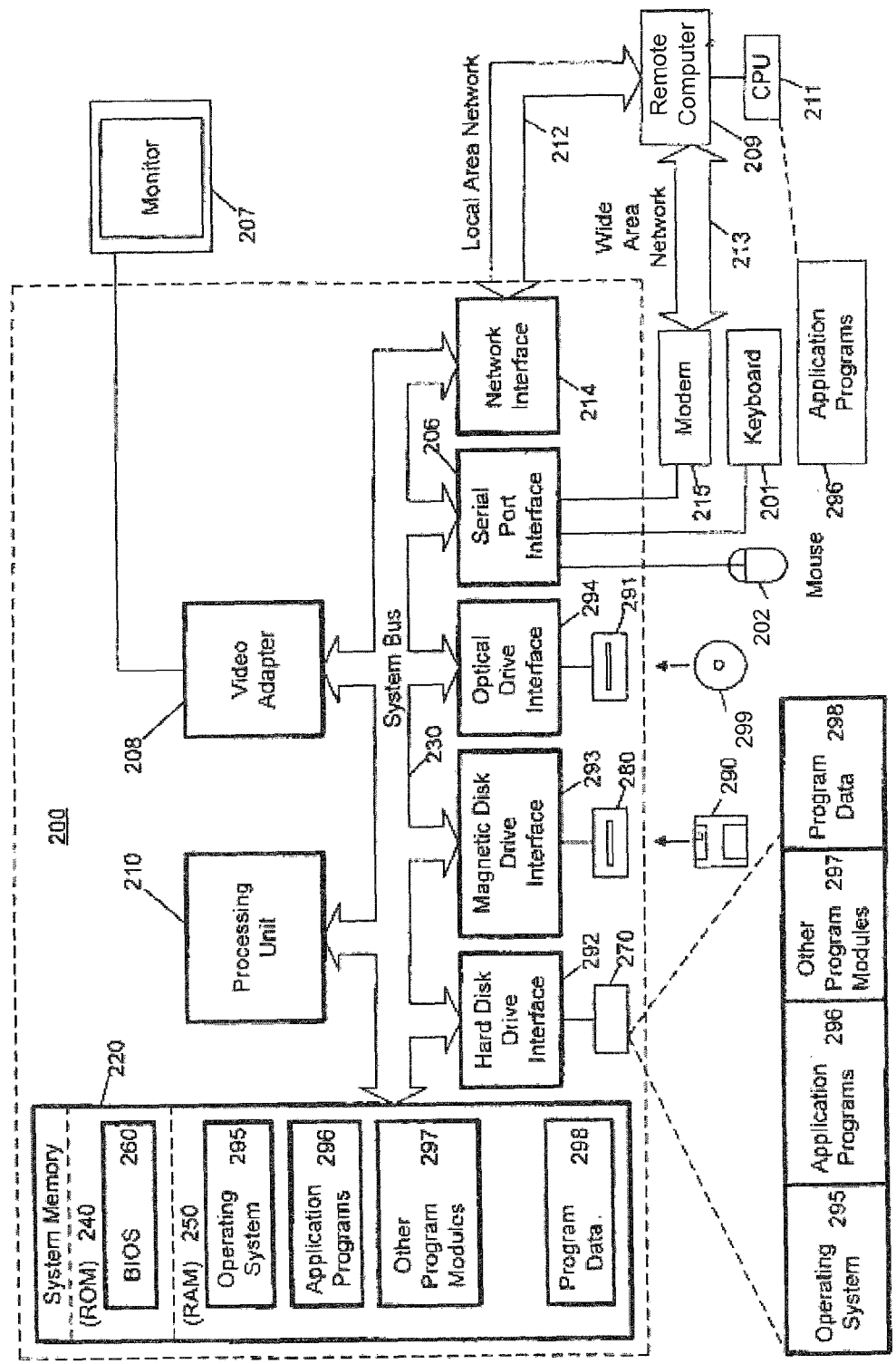
FIG. 1 shows a general purpose computer supporting a display and annotation of an electronic document in accordance with one or more embodiments.

FIG. 1 is a schematic diagram of a computing environment in which one or more embodiments may be implemented. One or more embodiments may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 299 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively.

An implementation of the described modules and techniques may be stored on or transmitted across some form of computer-readable media. The computer-readable media may include a variety of media that may be accessed by the personal computer 200. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

According to some embodiments, a number of program modules may be stored on the hard disk, magnetic disk 290, optical disk 299, ROM 240 or RAM 250, including an operating system 295, one or more application programs 296, other program modules 297, and program data 298. A user may enter commands and information into the personal computer 200 through input devices such as a keyboard 201 and pointing device 202. Other input devices in accordance with some embodiments (not shown) may include a microphone, joystick, game pad, satellite dish, scanner, or the like. These and other input devices can be connected to the processing unit 210 through a serial port interface 206 that is coupled to the system bus and may also be connected by other interfaces, such as a parallel port, game port or a universal serial bus (USB). A monitor 207 or other type of display device is also connected to the system bus 230 via an interface, such as a video adapter 208. Alternatively and/or additionally to the monitor 207, personal computers can include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and can include some or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments can be commonplace in offices, enterprise-wide computer networks, intranets, and the Internet.

When used in a LAN networking environment, the personal computer 200 can be connected to the local network 212 through a network interface or adapter 214. When used in a WAN networking environment, the personal computer 200 can include a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are for example only, and other means of establishing a communications link between the computers may be used.

In addition to the example system described in relation to FIG. 1, some embodiments be practiced on a handheld computer. Further, purpose-built devices may utilize some embodiments as well. Handheld computers and purpose-built devices can be similar in structure to the system of FIG. 1 but may be limited to a display (which may be touch-sensitive to a human finger or stylus), memory (including RAM and/or ROM), and a synchronization/modem port for connecting the handheld computer and purpose-built devices to another computer or a network (including the Internet) to download and/or upload documents or download and/or upload annotations. The description of handheld computers and purpose-built devices is known in the art and is omitted for simplicity. One or more embodiments may be practiced using C. Also, it is appreciated that other languages may be used including C++, assembly language, and the like.

Figure 2:
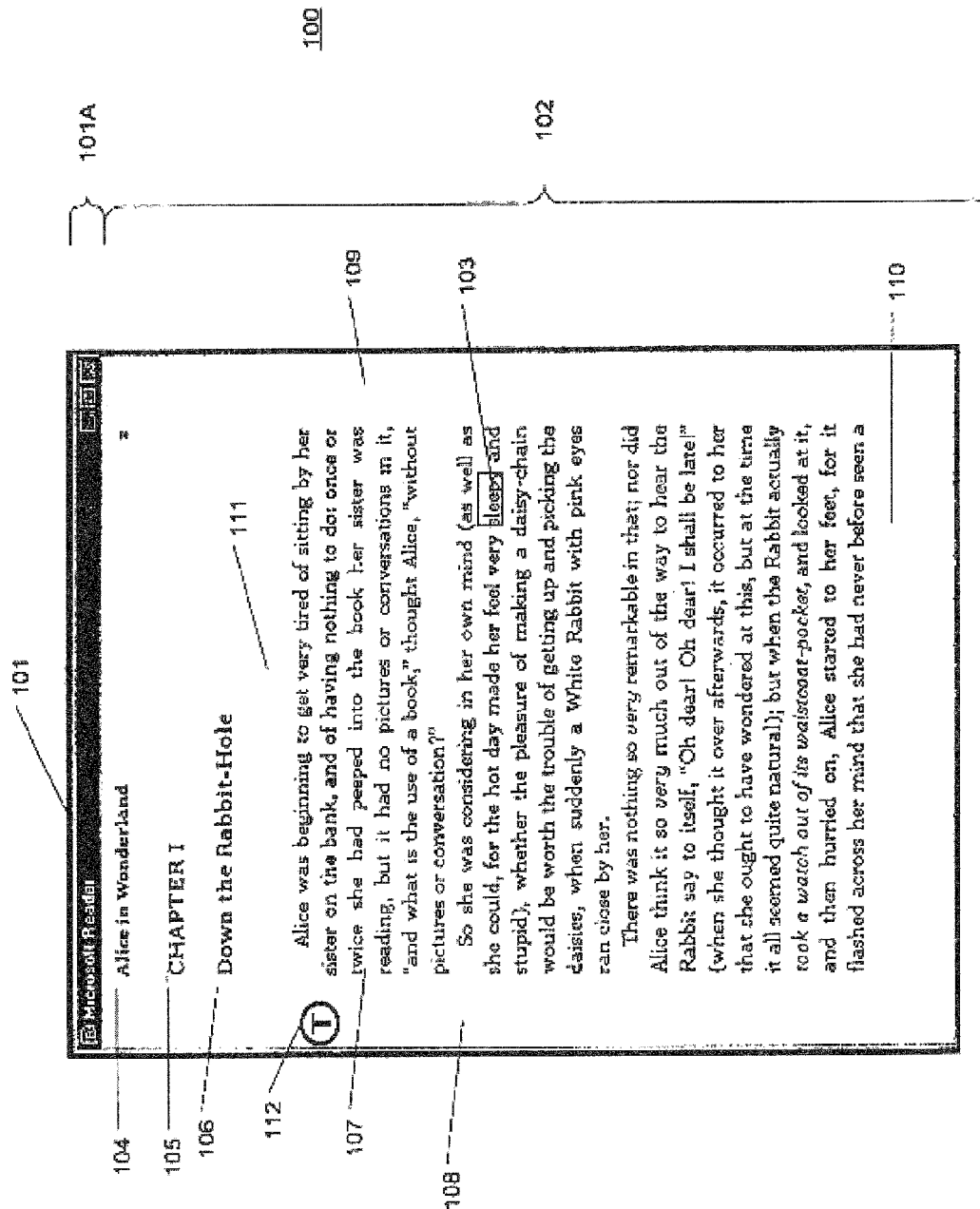
FIG. 2 shows a displayed document on a computer screen in accordance with one or more embodiments.

FIG. 2 shows a displayed document on a computer screen in accordance with one or more embodiments. The document can be displayed in a form that resembles the appearance of a paper equivalent of an e-book and, in this example, a paper novel. A document reader window 101 may comprise a variety of portions including a title bar 101A listing the title of the document and a body 102. In the body 102 of the display window, various portions of a document may be displayed. FIG. 2 shows an example where a title 104, a chapter number 105, a chapter title 106, and the text of the chapter 107 are displayed. Similar to an actual book, margins 108, 109, 110, and 111 appear around the displayed text. As referred to herein, the displayed elements may be independently referenced. Here, for example, an object 103 "sleepy" has a drawing annotation placing a box around it as placed there by the user. The presence of an icon 112 indicates that a text annotation is present in the line of text adjacent to the icon 112. While the icon 112 is represented as the letter "T" in a circle, it will be appreciated by those of skill in the art that other representations may be used to designate the presence of an annotation. For example, other letters may be used (for instance, the letter "A" for annotation) or other symbols may be used (for instance, a symbol of an open book) or any other representation that can indicate that an annotation exists. Tapping on (e.g., activating) the icon (or other designation) can result in the display of a stored annotation.

Figure 3:
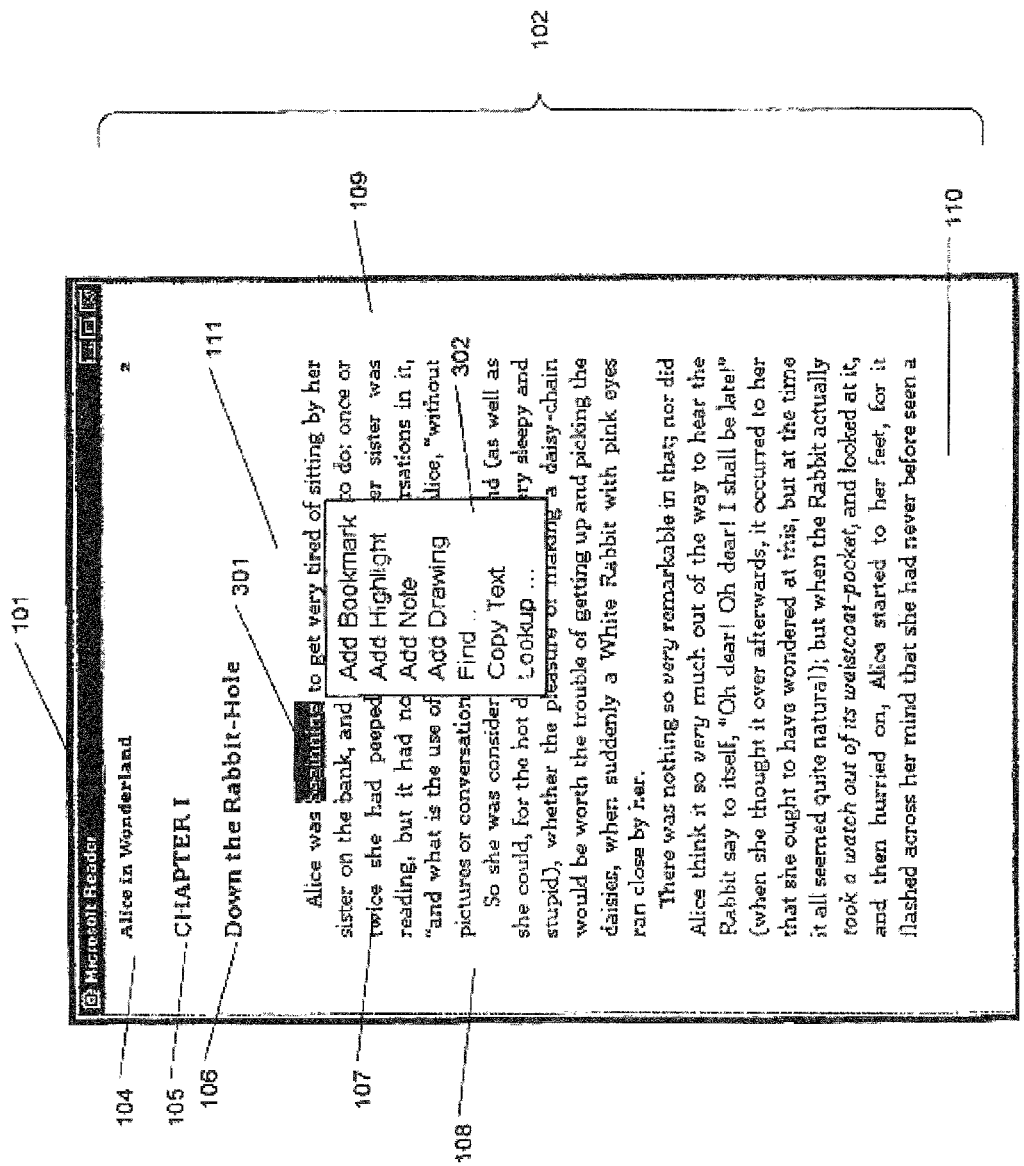
FIG. 3 shows a displayed document with an object selected in accordance with one or more embodiments.

FIG. 3 shows a displayed window after an object has been selected in accordance with one or more embodiments. Here, for example, the object "beginning" 301 in the first line of text 107 was selected. The object may be selected through tapping it with a stylus or a user's finger. Alternatively, a user may position a cursor over the object then select the object (by clicking a mouse button or by operating a designation source). As shown in FIG. 3, upon selection of the object, the object is shown as selected, meaning in this example that the pixels that make up the object and surrounding pixels are inverted. Some embodiments can include changing the color of the pixels surrounding the object or highlighting the object in some other way.

After an object has been selected, window 302 is displayed. Window 302 contains actions operable on the selected object. As represented in FIG. 3, the following options are displayed: Add Bookmark; Add Highlight; Add Note; Add Drawing; Find; Copy Text; and Lookup.

Various aspects of the actions associated with these menu options are treated in detail in the following disclosures:

U.S. Ser. No. 09/456,127, filed Dec. 7, 1999 and now issued as U.S. Pat. No. 6,992,687, entitled "Bookmarking and Placemarking a Displayed Document in a Computer System;"

U.S. Ser. No. 09/455,754, filed Dec. 7, 1999, entitled "Method and Apparatus for Installing and Using Reference Materials In Conjunction With Reading Electronic Content;"

U.S. Ser. No. 09/455,805, filed Dec. 7, 1999 and now issued at U.S. Pat. No. 7,337,389, entitled "System and Method for Annotating an Electronic Document Independently of Us Content;"

U.S. Ser. No. 09/455,806, filed Dec. 7, 1999 and now issued at U.S. Pat. No. 6,957,233, entitled "Method and Apparatus For Capturing and Rendering Annotations For Non-Modifiable Electronic Content;" the disclosures of which are incorporated herein in their entirety.

Alternatively or additionally, window 302 may also have other options including, for example, those that may affect the display of the content as well. For example, window 302 may include menu options that allow for switching from one book to another. An advantage of displaying more information to the user may include a net reduction in the number of navigation steps required to perform a process. In some example embodiments, by providing a menu option to allow one to change which book is currently being displayed, a user may switch between books with a few navigational commands. However, in some embodiments the total options available to a user at any given time may be substantial. Due to an overcrowding of window 302, displaying all options can decrease the intuitive nature of adding an annotation to a page.

As shown in FIG. 3, and in accordance with some embodiments, the number of options available to the user can be limited. By providing a limited number of options, the menu can quickly become tailored to the intention of the user. Also, in some embodiments the window 302 may be placed close to the selected object so as to minimize the distance needed to move a cursor or stylus to select one of the displayed menu items. By minimizing the actions displayed to the user, the desire to provide pure functionality to the user without cluttering the user's reading space can be fulfilled.

Figure 4:
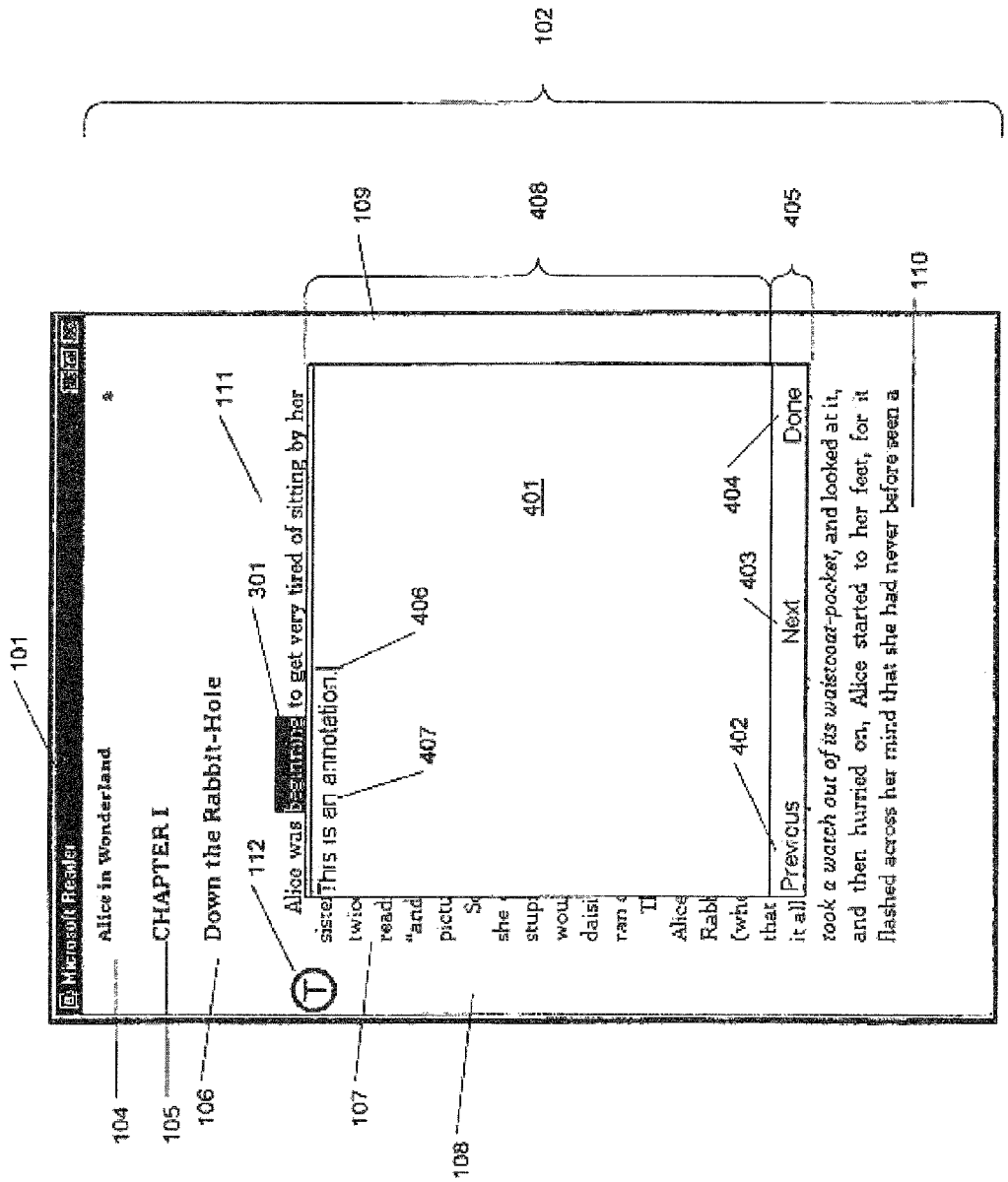
FIG. 4 shows a text annotation window in accordance with one or more embodiments.

FIG. 4 shows a display window 401 that accepts textual annotations in accordance with one or more embodiments. The display window 401 can be generated in response to a selection of "Add Note" from FIG. 3. Window 401 includes a body portion 408 as well as a navigation portion 405. As shown in FIG. 4, the two portions can be divided from each other. Alternatively, the navigation portion 405 may be integral with body portion 408. Body portion 408 includes text cursor 406, designating the location where new text will be entered. Also, body portion 408 includes previously entered text 407. To indicate that text has been entered, icon 112 can be displayed juxtaposed to the line containing the selected object 301.

Navigation portion 405 may include, for example, navigation options 402 and 403 as well as an option to close window 408. When selected, navigation option 402 labeled "Previous" can switch the displayed annotation to a previous annotation. Similarly, when selected, navigation option 403 labeled "Next" can switch the displayed annotation to the next annotation.

To close window 401, the user may tap on close option (here, for example, entitled "Done") 404. Alternatively or additionally, the user may tap anywhere outside window 401 to close window 401. By allowing a user to select a portion of the display outside window 401, the user can indicate a preference that the user's interest now lies outside of the window 401.

When a user navigates to another text annotation, the displayed content 107 of the book underlying window 401 may remain fixed at the location of the original text annotation 301. Alternatively or additionally, the displayed content 107 may follow the navigation to the next annotation. Using this second approach, if a user wanted to start reading at the location of the next annotation, the user may close window 401 through activation of close option (here, for example, entitled "Done") 404 or by activating (tapping, clicking, etc.) outside of window 401.

Figure 9:
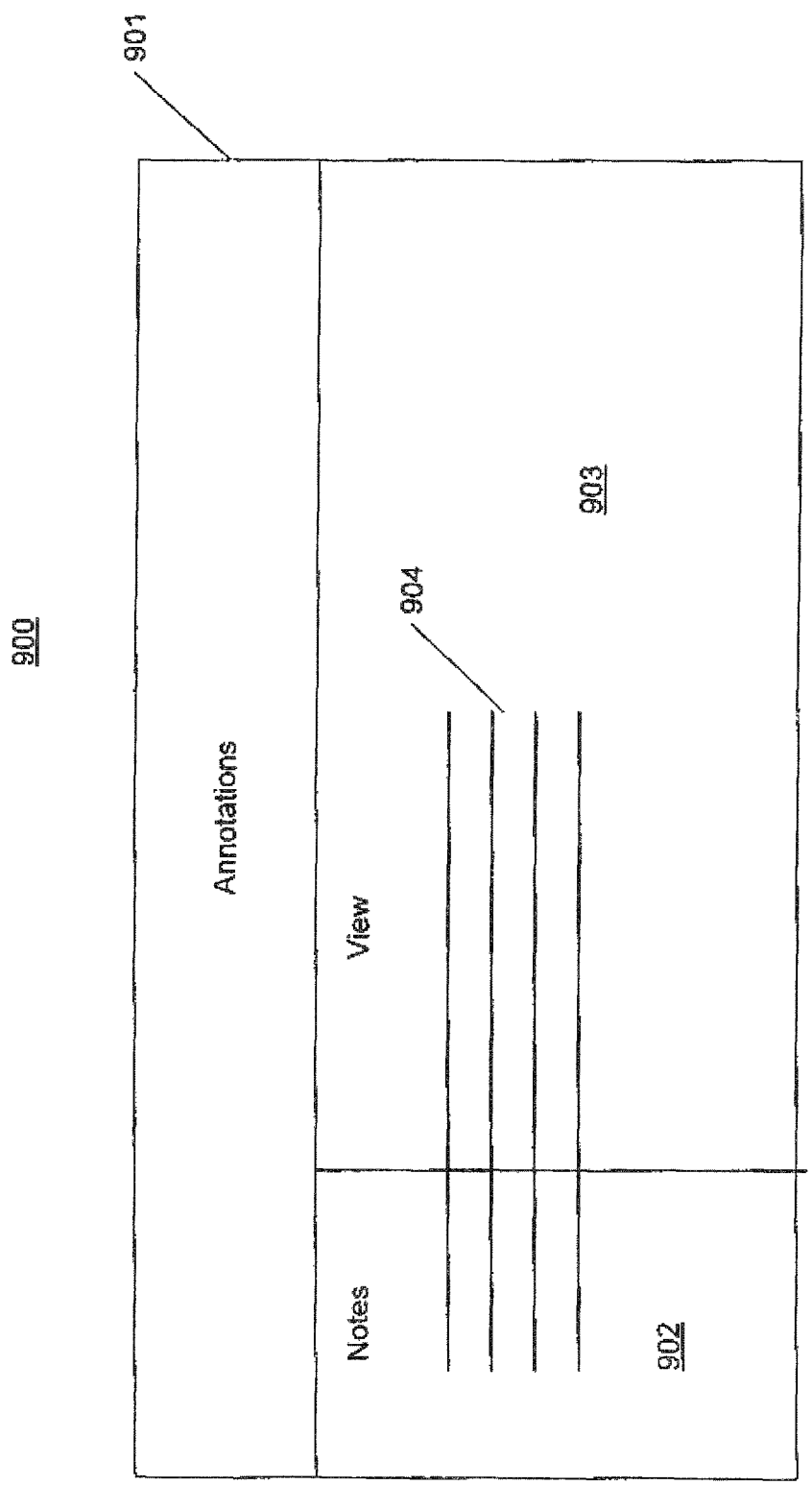
FIG. 9 shows a screen for manipulating annotations in accordance with one or more embodiments.

In accordance with some embodiments, the previous and next annotations may be the previous and next annotations as related to the book presently being viewed. In this regard, a list of annotations may be maintained. This list may be sorted as shown in FIG. 9. The ability to sort annotations can allow a user to reference the annotations through an alternative ordering method, alternative to a file position location in the book.

In addition to being able to navigate annotations in the presently displayed book, navigation of annotations in other books may also be used. For example, a user may have annotated an object in one book. While reading a second book, the user may make a second annotation. The user may then want to compare the annotations while reading the second book. To accomplish this goal, in some embodiments the user can operate the previous 402 and next 403 options in navigation portion 405 to step from one annotation to the next until arriving at the desired annotation. Alternatively or additionally, users may use a Search capability to locate annotations on any number of books/documents from a centralized Annotations Index page. Users can accomplish this by typing the text they are searching for in a sort/filter view anchored to the Annotations Index page and it would then return one or more occurrences (e.g., all) of the said text across one or more (e.g., all) annotations found.

In some embodiments, the display of windows 302 and 401 in response to user input is as fast as possible. This quick display furthers the paradigm of immediate response to user input. Alternatively or additionally, for stylistic reasons and further to some embodiments, the windows 302 and 401 may scroll down, unfurl, zoom in from a side of the screen, pop in, and/or appear via similar display techniques. One advantage of having a small delay in the display of a window allows for enhanced graphical displays. For example, an animated graphic may appear to highlight the action that is about to occur (e.g., a blue pane of a decorated white window may slide open indicating that a new window has been opened or is about to open). In some embodiments, if a delay occurs in the opening of windows 302 and 401, the user can be presented with a simple interface for authoring a text annotation and navigating among text annotations with ease.

In some embodiments, to navigate from one text annotation to another, the system can know the location of the previous and next text notes and where these locations are as compared to the displayed page of the book. Also in some embodiments, fixing a location of the textual annotation is accomplished by determining a file position of the displayed object.

Figure 5:
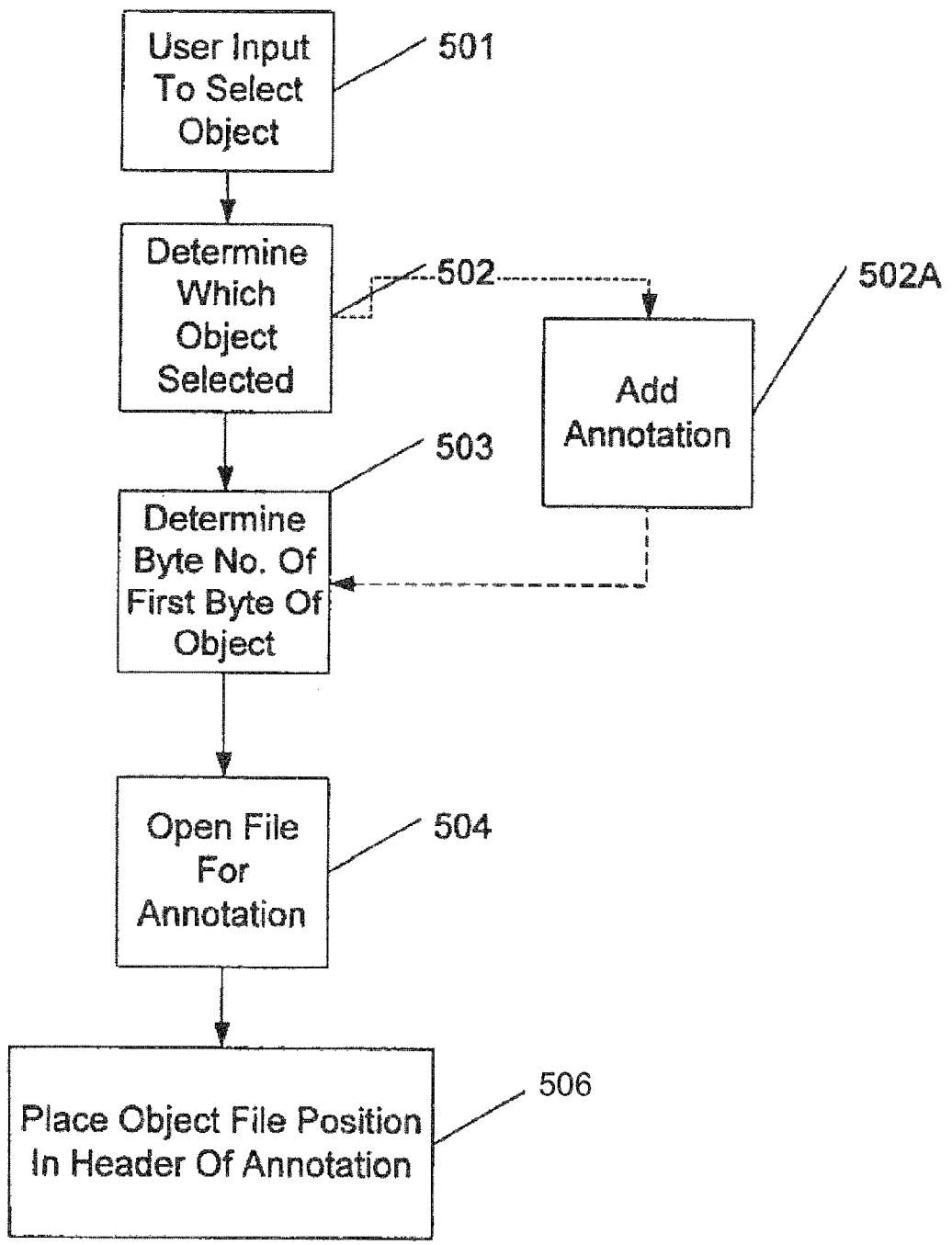
FIG. 5 shows a process for determining the file position of an object in accordance with one or more embodiments.

FIG. 5 shows a process for determining the file position of an object in accordance with one or more embodiments. In step 501, a user selects an object on the screen. The user may select the object via a cursor controlled through a mouse, touch-pad, trackball, or any appropriate pointing device. Alternatively or additionally, in some embodiments the user may use a stylus or finger if the surface of the display can accommodate such input.

In step 502, the system determines which object was selected by the user. This step can relate to a conversion of physical coordinates from the display device to coordinates inside the reader window. From this conversion, the object selected by the user can be known.

In some embodiments, step 502A is optional. It can relate to the user selection of an action post selection of the object. If the user is supplied with a menu after selection of the object, and the function of adding an annotation is provided on the menu, step 502A can relate to the selection of the adding the annotation function.

Step 503 can relate to the determination of the file position of the selected object. The file position may include the first byte of the selected object. Alternatively or additionally, the file position may include the first byte of the last character (or even the character following the last character) of the selected object. In accordance with some embodiments, selecting the first byte of the first character to determine the file position can provide the advantage of displaying any annotation on the page of the beginning of the object, rather than on the next page if the object spans a page. Those of skill in the art will appreciate that any byte of the selected object (or surrounding the selected object) may be selected to provide the file position of the object. Alternatively or additionally, one may select the line in which the object is located and/or one may select a line having the object. Further to some embodiments, one may select the paragraph or portion of the page (top, middle, or bottom) that is to be used to store the annotation.

In some embodiments, the file position may be determined by counting the number of bytes from some known file position to the location of, for example, the first character of the selected object. According to some embodiments, the known file position may be the beginning of the file, or may be, for example, a previously noted file position for the beginning of the current paragraph. The counting step may be performed before or after generation of the annotation. Alternatively or additionally, the counting step may be performed in the background while the annotation is being created by the user.

According to some embodiments, the characters preceding the selected object can be represented in the file by a variable-length character-encoding scheme like UTF-8, and thus the number of characters between the known file position and the selected object can be used to calculate a byte-offset between the known file position and the selected object. This byte-offset can then be added to the known file position to determine the file position of the selected object.

Step 504 can relate to creating a file to persist the annotation. While shown after step 503, it will be appreciated that it may occur prior to or during the determination of the file position of the object. In step 506, the file position is placed in the header of the file (or portion of the file) storing the created annotation. Alternatively or additionally, the file position may be appended to the file being viewed.

Figure 6:
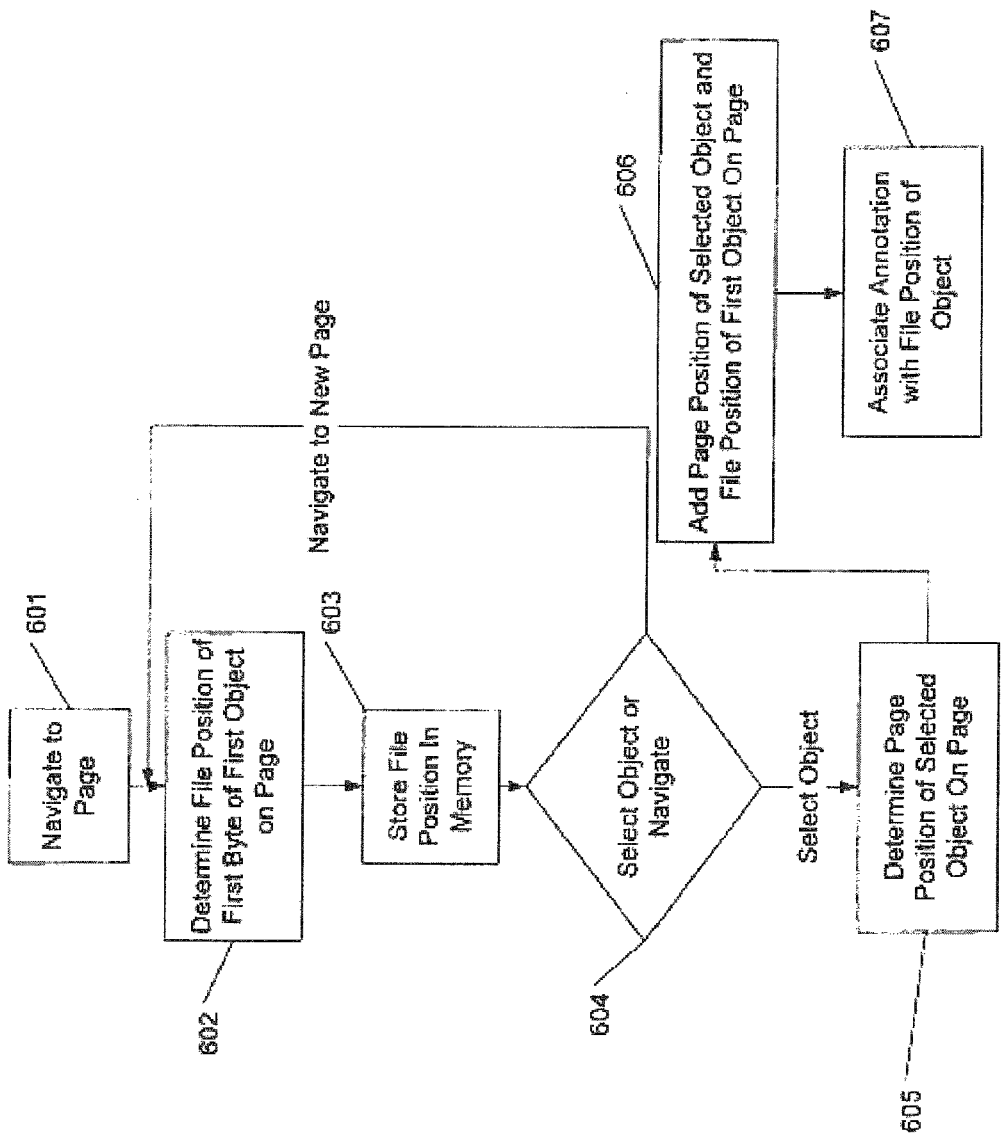
FIG. 6 shows another process for determining the file position of an object in accordance with one or more embodiments.

FIG. 6 shows another process for determining a file position of an object in accordance with one or more embodiments. FIG. 6 can be different from FIG. 5 in that FIG. 6 can attempt to pre-calculate a significant portion of the file position prior to receiving a selection of an object from the user. As shown in step 601, a user can navigate to a page.

Once on the page, the system can determine the file position of the first byte of the first object on the page as shown in step 602. In some embodiments, the file position may be determined every time a new page is displayed. Alternatively or additionally, the system may pause (for example, two seconds) before starting to determine the file position for the first byte in order to allow the user to navigate to a new page before starting the file position determination. This delay provides the advantage of minimizing system workload when a user is quickly flipping pages. In some embodiments, when a user pauses at a given page, the system may then determine the file position of the first byte.

In step 603, the file position of the page is temporarily stored in memory. In step 604, the system waits for either selection of an object or navigation to another page. More options can be provided that do not need the file position for execution (for example, looking up a term in a reference document as disclosed in U.S. Ser. No. 09/455,754, filed Dec. 7, 1999, entitled "Method and Apparatus for Installing and Using Reference Materials In Conjunction With Reading Electronic Content," whose contents are incorporated herein by reference in its entirety.)

In step 605, once an object is selected, the relative position of the selected object is determined with reference to the first byte of the first object on the displayed page. In step 606, the file position of the first byte of the first object on the page as determined in step 602 is retrieved from memory (as stored in step 603) and added to the relative position of the first byte of the selected object as determined in step 605 to determine the file position of the selected object.

In step 607, the file position of the selected object is stored along with the created annotation. In some embodiments, steps relating to the determination of the file position may occur before or after the annotation for the object. Alternatively or additionally, the file position may be pre-formed in the background while the annotation is being created. Those skilled in the art will appreciate that any number of techniques may be used to determine object position and still be considered to be within the spirit and scope of the claimed embodiments.

Figure 7:
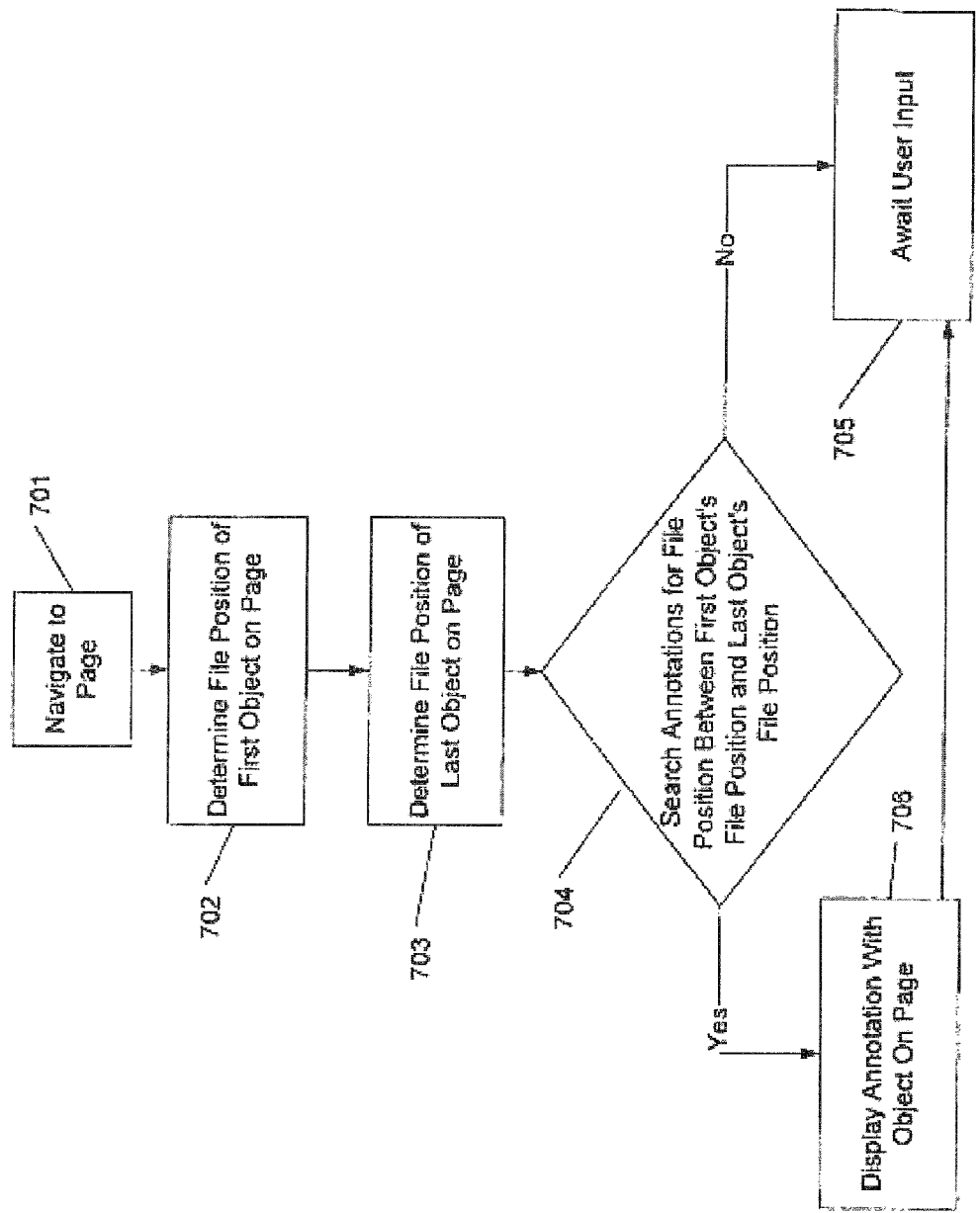
FIG. 7 shows a process for displaying annotations in accordance with one or more embodiments.

FIG. 7 relates to a process for displaying the created annotation when navigating to the page in accordance with one or more embodiments.

In step 701, a user navigates to a page. In step 702, the system determines a file position of a first object on the page. In step 703, the system determines a file position of a last object on the page.

In step 704, annotations stored for the document are searched to determine if any have file positions located between the file position determined in step 702 and the file position determined in step 703. In step 705, if no annotations with a file position are located for display on the displayed page ("No"), the system waits for user input (including, for example, navigation to a new page or selection of an object for annotation, or any other action described herein).

In step 706, an annotation has been found that relates to an object on the page ("Yes"). The location of the object on the page is determined and the annotation is displayed for the object. The system for determining the location of the object may include subtracting the file position of the first object on the page from the file position of the annotated object. This difference is then used to determine how many bytes from the first character of the page is the annotated object.

Alternatively or additionally, the system may count again from the beginning of the document to determine which object has been annotated. It will be appreciated by those skilled in the art that numerous methods exist for displaying the annotation for the annotated object. The above examples are not intended to be limiting.

In some embodiments and in the context of displaying the annotations that are determined to exist in a given "page" of the content (the unit of text being viewed by the user at any given time), the computer system can first validate a global state, which can determine whether annotations should be rendered. For example, the user can be provided with the ability to globally specify whether to show or hide drawing annotations (as well as text notes, bookmarks, highlights, etc.). Prior to displaying a particular annotation of an object, the computer system can check this global setting to determine whether or not to render the specific annotation. If the user has chosen to hide annotations of that particular type, the annotation may not be rendered.

Figure 8A:
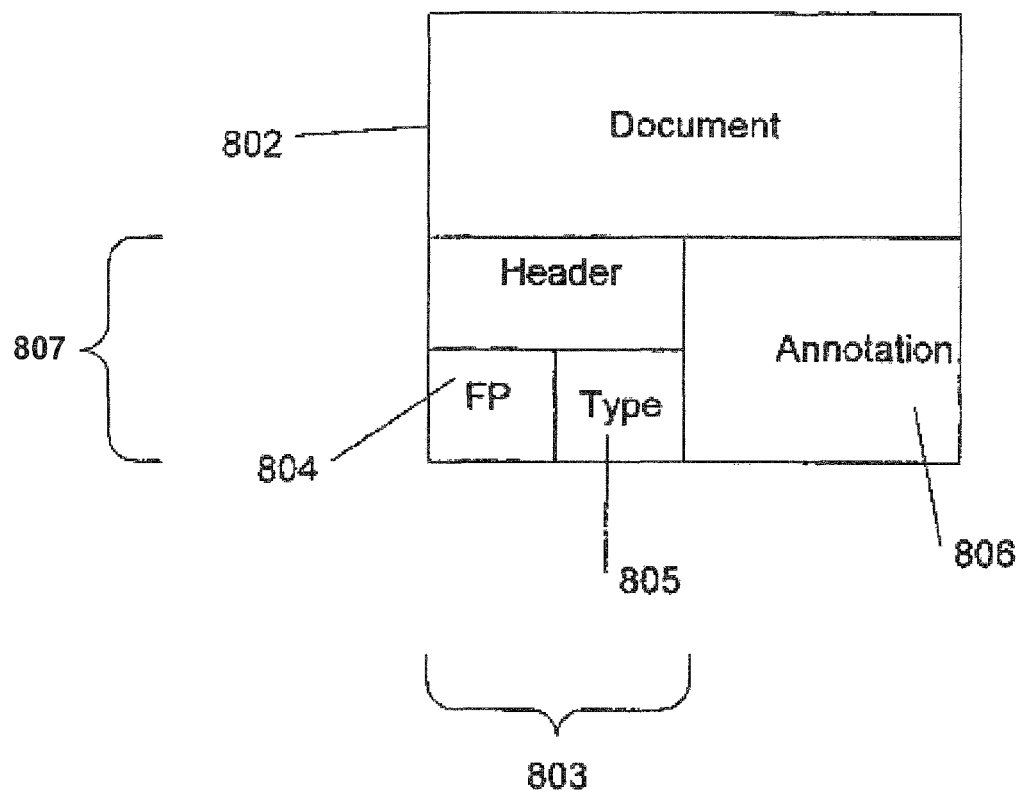
FIGS. 8A and 8B show various storage techniques for storing annotations in accordance with one or more embodiments.
Figure 8B:
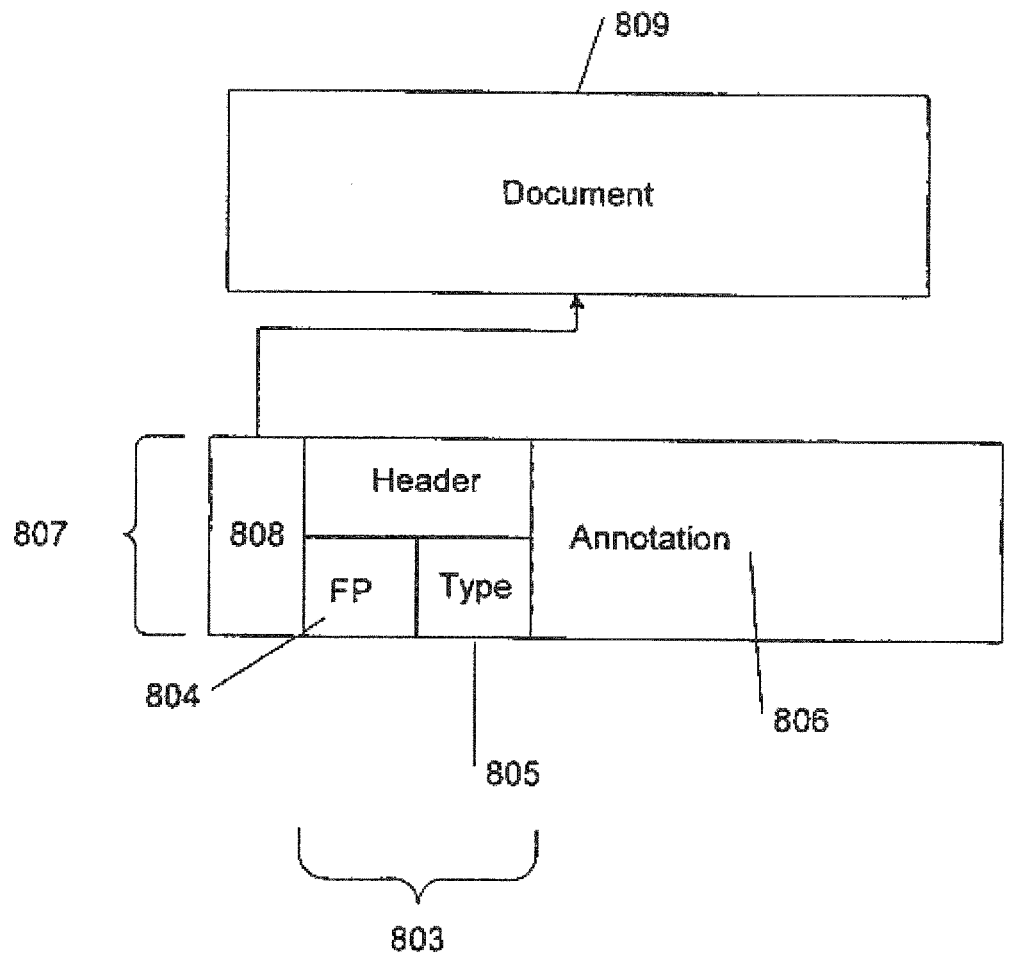

FIGS. 8A and 8B show various storage techniques for storing annotations in accordance with one or more embodiments. FIG. 8A shows a document 801 that has modifiable (803-806) and non-modifiable (802) portions. Files of this type can include, for example, Infotext file formats as are known in the art. Annotations 806 may be stored in combination with the non-modifiable content 802. An annotation 806 may be stored in a file with header 803 and body 806. The header 803 includes, for example, the file position 804 of the object with which the annotation 806 is associated. It may also include an indication of the type of annotation 806 in file portion 805. As discussed above, the annotation 806 may include a highlight, a bookmark, a drawing to be overlaid over the object, and/or a text annotation.

FIG. 8B shows the non-modifiable content 809 as a separate file apart from the annotation file in accordance with one or more embodiments. The annotation file 807 of FIG. 8B has similar constituent elements to that of annotation 807 of FIG. 8A. Annotation file 807 may include a file portion 808 that indicates to which non-modifiable document (here, 809) it is linked. Using the approach set forth in FIG. 8B, one file may store some or all annotations for a user with the non-modifiable content portions 809 being stored separately. In some embodiments, this approach has the advantage of being able to quickly scan all annotations at one time rather than accessing all documents 801 (as including non-modifiable portions 802) to obtain all annotations stored therein.

FIG. 9 shows a display window for sorting, modifying, searching, and renaming the annotations stored in a system in accordance with one or more embodiments. The window 900 includes a title identifier 901 to alert the user that he or she is in an annotation pane 900. The window 900 may include two panes 902 and 903 (other panes may be added as needed). Panes 902 and 903 may provide a listing of annotations 904 by document. Alternatively or additionally, they may provide a listing of all annotations in a person's system. In some embodiments, when in pane 902 (here, entitled "Notes"), the user may sort the list of annotations by type (e.g., highlight, drawing, text, bookmark). Selecting an annotation can allow one to navigate to the location in the document containing the annotation. In some embodiments, selecting and holding the annotation can allow one to remove, change the appearance of, hide or show that particular annotation, and/or rename the annotation. The second pane 903 (here, entitled "View") may allow a user to sort annotations based on their properties. For example, one may sort on the time created, time last accessed, by type, alphabetically, and on book order.

In the foregoing specification, embodiments are described with reference to specific examples. Although various embodiments are described, those skilled in the art will recognize that various modifications, embodiments or variations of the claimed embodiments can be practiced within the spirit and scope of the appended claims. The specification and drawings are, therefore, to be regarded in an illustrative rather than restrictive sense.

What is claimed is:

1. A computer-implemented method for annotating an object in an electronic document, the method comprising:
   receiving a selection of the object in the electronic document;
   receiving an annotation in association with the selected object;
   maintaining the annotation in a list of annotations;
   displaying the annotation;
   receiving a selection of the annotation; and
   in response to the selection of the annotation:
      navigating to a location of the selected object in the electronic document;
      displaying a window that includes a portion of the selected annotation; and
      closing the window upon receiving a user input to a page of the electronic document outside of the window.

2. The method of claim 1, wherein the displayed annotation includes an indication of the location of the selected object.

3. The method of claim 1, wherein the annotation is a note.

4. The method of claim 1, further comprising performing at least one of sorting, modifying, deleting, searching, or renaming the selected annotation.

5. The method of claim 1, wherein the annotation comprises one or more of a bookmark, a highlight, a note, or a drawing.

6. The method of claim 1, wherein navigating to the location of the annotation further comprises displaying the selected object.

7. The method of claim 1, further comprising hiding a type of the annotation.

8. The method of claim 1, wherein the electronic document comprises an electronic book.

9. A system comprising:
   one or more processors; and
   one or more computer-readable storage media storing computer-executable instructions that are executable by the one or more processors to cause the system to perform operations comprising:
      receiving a first selection of a first object in an electronic document;
      receiving a first annotation in association with the first object;
      maintaining the first annotation in a list of annotations;
      receiving a second selection of a second object in the electronic document, the second object being different from the first object;
      receiving a second annotation in association with the second object;
      maintaining the second annotation in the list of annotations;
      receiving a third selection of the second annotation; and
      in response to the third selection of the second annotation:
         navigating to a location of the second object in the electronic document;
         displaying a window that includes at least a portion of the second annotation; and
         closing the window responsive to receiving a user selection of a portion of a display of a page of the electronic document outside of the window.

10. The system of claim 9, wherein one or more of the first annotation or the second annotation comprises a note.

11. The system of claim 9, wherein the operations further comprise displaying the second annotation with an indication of the location of the second object.

12. The system of claim 9, wherein the operations further comprise displaying the second object responsive to navigating to the location of the second object.

13. The system of claim 9, wherein the operations further comprise hiding one or more types of annotations.

14. The system of claim 9, wherein one or more of the first annotation or the second annotation includes one or more of a bookmark, a highlight, a note, or a drawing.

15. The system of claim 9, wherein the electronic document comprises an electronic book.

16. One or more computer-readable storage media having instructions that, responsive to execution by a computing device, cause the computing device to perform operations comprising:

receiving a first selection of a first text in an electronic book;
receiving a first note in association with the first text;
maintaining the first note in a list of annotations;
receiving a second selection of a second text in the electronic book, the second text being different from the first text;
receiving a second note in association with the second text;
maintaining the second note in the list of annotations;
receiving a third selection of the second note; and
in response to the third selection of the second note:
    navigating to a location of the second text in the electronic book;
    displaying a user interface that includes a portion of the second note; and
    closing the user interface in response to receiving a user input outside of the user interface and to a page of the electronic book that includes the second text.

17. One or more computer-readable storage media of claim 16, wherein the operations further comprise performing one or more of sorting, modifying, deleting, searching, or renaming the selected annotation.

18. One or more computer-readable storage media of claim 16, wherein the operations further comprise:
    displaying the second note; and
    indicating via the second note the location of the second text in the electronic book.

19. One or more computer-readable storage media of claim 16, wherein the user input to the page of the electronic book includes at least one of tapping or clicking a portion of the page of the electronic book outside of the user interface.

20. One or more computer-readable storage media of claim 16, wherein the operations further comprise hiding one or more types of annotations.

\* \* \* \* \*